Patented June 14, 1949

2,472,811

UNITED STATES PATENT OFFICE 2,472,811

POLYMERS OF ALPHA-FLUOROMETHYL ACRYLIC ACID ESTERS

Joseph B. Dickey, Rochester, N. Y., assignor to Eastman Kodak Company, Rochester, N. Y., a corporation of New Jersey No Drawing. Application April 27, 1946, Serial No. 665,620

8 Claims. (Cl. 260—83)

This invention relates to polymers and copolymers of acrylic acid and derivatives containing fluorine atoms and more particularly to polymers and copolymers of alpha-difluoromethyl-, alpha-difluorochloromethyl- and alpha-trifluoromethyl-acrylic acids and derivatives. It also relates to a method for their preparation.

It is known that esters of methacrylic acid can be prepared by treating acetone cyanhydrin with fuming or concentrated sulfuric acid and subsequently heating the reaction mixture with a monohydric alcohol, and further that such esters polymerize to resinous materials. It is also known that methacrylamide can be prepared by reacting acetone cyanhydrin with sulfuric acid in the presence of sulfur, that methacrylonitrile can be prepared by pyrolysis of cyano isopropyl acetate and that these compounds are also polymerizable to resinous polymers. I have now found that the alpha-difluoromethyl-, alpha-difluorochloromethyl- and alpha-trifluoromethylacrylic acids and various esters, amide and nitrile derivatives can be prepared, in general, by similar methods, and that these new compounds are polymerizable alone or conjointly with polymerizable vinyl compounds to give resins having higher melting points and greater stability to heat and combustion than the resins obtained by polymerizing the corresponding non-fluorinated methacrylic acids and derivatives.

It is, accordingly, an object of my invention to provide new resinous polymers of 'alpha-fluoromethyl acrylic acids and derivatives. Another object is to provide a process for preparing such polymeric compounds. Other objects will become apparent hereinafter.

In accordance with my invention, compounds which can be represented by the following general formula:

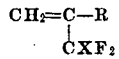

wherein R represents a cyano group, a —COOR$_1$ group, wherein R$_1$ represents an atom of hydrogen, an atom of an alkali-forming metal, for example, lithium, sodium, potassium, caesium, calcium, barium, an alkyl group having from 1 to 4 carbon atoms in the chain, for example, methyl, ethyl, propyl, isopropyl, n-butyl, isobutyl, sec.-butyl, tert.-butyl, β-acetaminoethyl, a cycloalkyl group, for example, cyclohexyl, a furfuryl group, for example, tetrahydrofurfuryl, an aryl group of the benzene series, for example, phenyl, benzyl, a

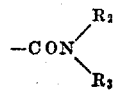

group, wherein R$_2$ and R$_3$ each represent an atom of hydrogen, an alkyl group having from 1 to 4 carbon atoms, for example, methyl, ethyl, propyl, isopropyl, n-butyl, isobutyl sec.-butyl, tert.-butyl, an aryl group of the benzene series, for example, phenyl, benzyl, a cycloalkyl group, for example, cyclohexyl, a furfuryl group, for example, tetra-hydrofurfuryl, and X represents an atom of hydrogen, fluorine or chlorine; are polymerized alone or conjointly with one or more polymerizable unsaturated organic compounds, for example, with vinyl acetate, vinyl butyrate, vinyl trifluoroacetate, vinyl-ω-acetaminoacetate, methyl acrylate, methyl methacrylate, styrene, ortho-acetamino styrene, alpha-methyl styrene, 2,4-dichloro-alpha-methyl styrene, acrylonitrile, alpha-methacrylonitrile, alpha-acetoxyacrylonitrile, alpha-acetoxy methacrylate, vinyl chloride, vinyl fluoride, vinylidene chloride, vinylidene chloride-fluoride, vinylmethylketone, trifluoromethyl vinyl ketone, vinylmethylether, vinyl-ω-trifluoroethyl ether, vinylmethylsulfone, vinyl sulfonamide, methyl fumarate, methyl maleate, fumaronitrile, cis- and trans-β-cyano and carboxamido-methyl acrylate, vinyl methyl urethane, acrylic amide, acrylic ethylamide, vinyl phthalimide, vinyl succinimide, acrylic acid, maleic anhydride, ethylene, iso-butylene, butadiene, and other similar kinds of unsaturated polymerizable monomeric compounds. The intermediate monomeric alpha-fluoromethyl derivatives of acrylic acid are described and claimed in my copending application, Serial No. 665,621 filed of even date herewith.

The polymerizations are facilitated by heat and pressure and by catalysts, for example, light, oxygen, ozone, benzoyl peroxide, acetyl peroxide, hydrogen peroxide, sodium peroxide, boron trifluoride, aluminum chloride, tin tetrachloride, and similar compounds. With the halide type of catalysts, best results are obtainable by conducting the polymerization at very low temperatures, for example, in the range of -50° to -190° C. In many cases, superior resins are obtained by carrying out the polymerizations under pressures upward from 500 atmospheres. The polymerizations can be carried out in mass, in emulsion, in beads or in solutions of inert solvents including such as water, benzene, carbon tetrachloride or dioxane. When copolymers are prepared, the proportion of the fluoromethacrylic compound polymerizing conjointly with the monomeric vinyl compound can be varied within wide limits. For example, useful products can be obtained with starting mixtures wherein the amount of the fluoromethacrylic compound can vary about from 1 to 99 molecular parts and the vinyl compound about from 99 to 1 molecular parts. The resins obtained from the various mixtures will vary somewhat in physical and chemical

Example VIII.—Copolymer of alpha-difluoromethyl-methylacrylate and vinyl fluoride 13.6 grams of alpha-difluoromethyl-methylacrylate were charged into a silver lined autoclave with 4 grams of vinyl fluoride and nitrogen containing a trace of oxygen was pressed into the autoclave, until a pressure of several thousand atmospheres was reached. The temperature of the vessel was slowly raised to about 180° C. and maintained at this point for about 10 hours. The autoclave was cooled, opened and the polymer removed by extraction with trichloroethylene. Upon evaporation of the solvent, there was obtained a slightly yellowish colored, hard and tough solid, which was useful for drawing into filaments and for making coating compositions for covering wires and similar materials. In place of vinyl fluoride in the above example, there can be substituted equivalent amounts of vinyl chloride, vinylidene dichloride, vinylidene chloride fluoride or vinylidene tetrafluoride. The alpha-difluoromethyl-methylacrylate employed in the above example can be replaced by alpha-trifluoromethyl-methylacrylate or alpha-difluorochloromethyl-methylacrylate.

Example IX.—Copolymer of alpha-trifluoromethyl-methylacrylate and methyl methacrylate 15.4 grams of alpha-trifluoromethyl-methylacrylate and 20 grams of methyl methacrylate were polymerized by the method of sealing in a tube and heating at 50° C., until polymerization was complete. A hard, brilliant, moldable resin was obtained. In place of methyl methacrylate in the above example, there can be substituted an equivalent amount of ethyl methacrylate, propyl methacrylate, butyl methacrylate, phenyl methacrylate, and in place of the trifluoromethyl-methylacrylate an equivalent amount of difluoromethyl-methylacrylate.

Example X.—Copolymer of alpha-difluoromethyl-methylacrylate and acrylonitrile 13.6 grams of alpha-difluoromethyl-methylacrylate and 1 gram of acrylonitrile were polymerized in a closed tube at 50° C. until polymerization was complete. The resin obtained was slightly colored, hard and moldable. In place of the acrylonitrile, there can be substituted in the above example an equivalent amount of alpha-methacrylonitrile or alpha-chloroacrylonitrile. Corresponding resinous compounds can be obtained by copolymerizing alpha-trifluoromethyl-methylacrylate with the various acrylonitriles above mentioned.

Example XI.—Copolymer of alpha-difluoromethyl-methylacrylate and styrene

A. 13.6 grams of alpha-difluoromethyl-methylacrylate and 10.4 grams of styrene were polymerized at 50° C., in a sealed tube, using 0.02 gram of benzoyl peroxide as a catalyst. A clear, moldable solid was obtained.

B. 10 grams of alpha-difluoromethyl-methylacrylate were placed in a Dewar flask and cooled with a mixture of carbon dioxide snow and acetone to a temperature about from —60° C. to —70° C. Then sufficient boron trifluoride was added to catalyze the reaction. A clear, hard solid of high molecular weight was obtained. In the place of boron trifluoride, there can be substituted any of the usual Friedel-Crafts type of catalyst, for example, aluminum chloride.

Example XII.—Copolymer of alpha-difluoromethylacrylonitrile and styrene 50 grams of alpha-difluoromethylacrylonitrile, 10 grams of styrene and 0.6 gram of benzoyl peroxide were polymerized at 50° C. in a stoppered bottle. When the polymerization was about 15–30 per cent complete, phenyl-alpha-naphthylamine was added and the mixture poured with stirring into methanol. The white solid which separated as a precipitate was filtered off, washed with methanol and dried. Fibers spun from an acetone solution of the polymer showed good physical properties after stretching. In place of the alpha-difluoromethylacrylonitrile in the above example, there can be substituted alpha-trifluoromethylacrylonitrile and in place of the styrene, alpha-methylstyrene, dichlorostyrene, ortho-acetamino styrene, and similar compounds, to obtain corresponding resinous products.

Example XIII.—Copolymer of alpha-difluoromethyl acrylic-N-ethylamide and alpha-acetoxyacrylonitrile 5 grams of alpha-difluoromethyl acrylic-N-ethylamide were polymerized at 50° C. in acetic acid solution with 50 grams of alpha-acetoxyacrylonitrile, using dichloro-dimethylhydantoin as a catalyst. The reaction mixture was poured into water and the yellowish-white precipitate thus formed was filtered off, washed and dried. Related resinous products can be obtained by replacing the amide compound of the above example by alpha-difluoromethyl acrylic-N-diethylamide, alpha-difluoromethyl acrylic-N-methylamide, alpha-difluoromethyl acrylic-N-dimethylamide, alpha-difluoromethyl acrylic-N-methylethylamide, alpha-trifluoromethyl acrylic-N-ethylamide, alpha-trifluoromethyl acrylic-N-diethylamide, alpha-difluoromethyl acrylic-N-propylamide, alpha-difluoromethyl acrylic-N-dipropylamide, alpha-trifluoromethyl acrylic-N-isobutylamide, alpha-trifluoromethyl acrylic-N-sec.-butylamide, alpha-trifluoromethyl acrylic-N-phenylamide, and similar compounds having substituted amide groups.

Example XIV.—Copolymer of alpha-difluoromethyl-methylacrylate and methyl isopropenylketone 10 grams of alpha-difluoromethyl-methylacrylate and 10 grams of methyl isopropenyl ketone were polymerized in the presence of acetyl peroxide. The product was a clear, colorless, tough and moldable solid. For the ketone used in the above example, there can be substituted vinyl methyl ketone, vinyl methyl sulfone or isopropenyl methyl sulfone.

Example XV.—Copolymer of alpha-trifluoromethyl-methylacrylate and ethylene 10 grams of alpha-trifluoromethyl-methylacrylate were placed in a 100 cc. high pressure autoclave and ethylene containing a trace of oxygen was presed in, until a pressure of 30,000 pounds was reached. The temperature was then slowly raised to about 180° C., and kept at this point, until the polymerization was complete. When cool, the tough, elastic, slightly yellowish colored resinous product was removed from the autoclave. The derivatives of alpha-difluoromethyl-, alpha-difluorochloromethyl- and alpha-trifluoromethyl-acrylic acids can also be copolymerized with ethylene, propylene or iso-butylene, using the procedure described in U. S. Patent 2,342,400.

*Example XVI.—Copolymer of alpha-trifluoromethyl-methylacrylate and dialkylfumarates*

15 grams of alpha-trifluoromethyl-methylacrylate, 9 grams of diethylfumarate and 9 grams of dimethylfumarate were polymerized in mass, using benzoyl peroxide as a catalyst. A hard, clear, moldable solid was obtained. In place of the alpha-trifluoromethyl-methylacrylate, there can be substituted an equivalent amount of alpha-difluoromethyl-methylacrylate or alpha-difluorochloromethyl-methylacrylate.

*Example XVII.—Copolymer of alpha-difluoromethylacrylonitrile and butadiene*

4 grams of alpha-difluoromethylacrylonitrile, 16 grams of butadiene, 0.5 gram of urea peroxide, 0.9 gram of gelatin, 0.05 gram of 2-ethylhexanol, 0.06 gram of carbon tetrachloride and 0.18 gram of a sodium alkyl naphthalene sulfonate were emulsified and held at 55° C., for a period of four days with stirring. Then phenyl-alpha-naphthylamine was added and the polymer precipitated by adding hydrochloric acid. The polymer thus obtained was tough, elastic and vulcanizable. In place of the butadiene used in the above example, there can be substituted an equivalent amount of 2-methylbutadiene, 2,3-dimethylbutadiene, 2-chlorobutadiene, 2-cyanobutadiene, 2-acetoxybutadiene, 2-acyloxybutadiene, 2-acetaminobutadiene, 2 - methyl - 3 - cyanobutadiene, and in place of the alpha-difluoromethyl-methylacrylate, there can be substituted alpha-trifluoromethyl-methylacrylate. The proportions specified in the above example are not limited to such amounts since valuable products can also be obtained with widely varying proportions of the fluoromethyl compounds to the butadiene compounds. For example, by the process of this example, tough, elastic and vulcanizable products have been obtained wherein the proportions polymerized together varied about from 1 to 99 molecular parts of alpha-difluoromethyl-methylacrylate and about from 99 to 1 molecular parts of butadiene.

What I claim is:

1. A polymer obtained by heating in the presence of a polymerization catalyst a compound having the general formula:

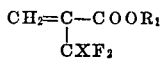

wherein $R_1$ represents an alkyl group containing from 1 to 4 carbon atoms, and X represents a member selected from the group consisting of a hydrogen atom and an atom of fluorine.

2. A copolymer obtained by heating in the presence of a polymerization catalyst a mixture containing as the sole unsaturated components from 1 to 99 molecular parts of alpha-difluoromethyl-methylacrylate and from 99 to 1 molecular parts of vinyl acetate.

3. A copolymer obtained by heating in the presence of a polymerization catalyst a mixture containing as the sole unsaturated components from 1 to 99 molecular parts of alpha-difluoromethyl-methylacrylate and 99 to 1 molecular parts of acrylonitrile.

4. A copolymer obtained by heating in the presence of a polymerization catalyst a mixture containing as the sole unsaturated components from 1 to 99 molecular parts of alpha-trifluoromethyl-methylacrylate and from 99 to 1 molecular parts of methyl methacrylate.

5. The process of preparing a polymer of an alpha-fluoromethyl-alkylacrylate which comprises heating in the presence of a polymerization catalyst a compound having the general formula:

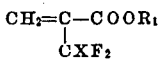

wherein $R_1$ represents an alkyl group containing from 1 to 4 carbon atoms, and X represents a member selected from the group consisting of a hydrogen atom and an atom of fluorine.

6. The process of preparing a copolymer which comprises heating in the presence of a polymerization catalyst a mixture containing as the sole unsaturated components from 1 to 99 molecular parts of alpha-difluoromethyl-methylacrylate and from 99 to 1 molecular parts of vinyl acetate.

7. The process of preparing a copolymer which comprises heating in the presence of a polymerization catalyst a mixture containing as the sole unsaturated components from 1 to 99 molecular parts of alpha-difluoromethyl-methylacrylate and from 99 to 1 molecular parts of acrylonitrile.

8. The process of preparing a copolymer which comprises heating in the presence of a polymerization catalyst a mixture containing as the sole unsaturated components from 1 to 99 molecular parts of alpha-trifluoromethyl-methylacrylate and from 99 to 1 molecular parts of methyl methacrylate.

JOSEPH B. DICKEY.

REFERENCES CITED

The following references are of record in the file of this patent:

UNITED STATES PATENTS

| Number | Name | Date |
|---|---|---|
| 2,414,330 | Renoll | Jan. 14, 1947 |